US011715123B2

(12) United States Patent
Tang et al.

(10) Patent No.: US 11,715,123 B2
(45) Date of Patent: Aug. 1, 2023

(54) SYSTEM AND METHOD FOR TESTING MULTIPLE VARIANTS

(71) Applicant: Beijing DiDi Infinity Technology and Development Co., Ltd., Beijing (CN)

(72) Inventors: Liang Tang, Santa Clara, CA (US); Bo Tan, Sunnyvale, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 323 days.

(21) Appl. No.: 17/018,309

(22) Filed: Sep. 11, 2020

(65) Prior Publication Data

US 2021/0192550 A1    Jun. 24, 2021

Related U.S. Application Data

(60) Provisional application No. 62/950,209, filed on Dec. 19, 2019.

(51) Int. Cl.
*G06Q 30/02* (2023.01)
*G06F 9/54* (2006.01)
*G06Q 30/0204* (2023.01)

(52) U.S. Cl.
CPC ......... *G06Q 30/0204* (2013.01); *G06F 9/541* (2013.01)

(58) Field of Classification Search
CPC .................... G06Q 30/0204; G06F 9/541
See application file for complete search history.

(56) References Cited

U.S. PATENT DOCUMENTS 9,201,770 B1 * 12/2015 Duerk ................. G06F 11/3452
11,132,700 B1 * 9/2021 Yin ..................... G06Q 30/0201
(Continued)

FOREIGN PATENT DOCUMENTS

| CN | 104053177 A | 9/2014 |
|---|---|---|
| CN | 109656967 A | 4/2019 |
| CN | 110334133 A | 10/2019 |

OTHER PUBLICATIONS

Kamal et al. "Enhancing the Automation of GUI Testing" In Proceedings of the 8th International Conference on Software and Information Engineering (ICSIE '19). Association for Computing Machinery, New York, NY, USA, 66-70. https://doi.org/10.1145/3328833.3328842. (Year: 2019).*

(Continued)

*Primary Examiner* — Eric W Stamber
*Assistant Examiner* — Alissa D Karmis
(74) *Attorney, Agent, or Firm* — Sheppard Mullin Richter & Hampton LLP

(57) ABSTRACT

Methods, systems, and apparatus, including computer programs encoded on computer storage media, for testing a plurality of variants among a plurality of users. One of the methods includes: determining a spatial granularity to divide an area into a plurality of grid cells; randomly splitting the plurality of grid cells into a plurality of testing groups, wherein a quantity of the plurality of testing groups is determined based on a quantity of the multiple versions of the feature to be tested; determining a temporal granularity to divide a testing period into a plurality of testing intervals; during each of the plurality of testing intervals, respectively assigning the multiple versions of the feature to the plurality of testing groups; and obtaining a treatment effect for each of the multiple versions of the feature and determining an optimal version of the feature.

19 Claims, 7 Drawing Sheets

(56) References Cited

U.S. PATENT DOCUMENTS

2016/0034824 A1 2/2016 Dong et al.
2016/0267509 A1* 9/2016 Grosso ............... G06Q 30/0283
2020/0034882 A1* 1/2020 Deng ................. G06Q 30/0244
2020/0410529 A1* 12/2020 Lebedev ............ G06Q 30/0243

OTHER PUBLICATIONS

Nguyen et al., "Model-Based Testing of Multiple GUI Variants Using the GUI Test Generator" In Proceedings of the 5th Workshop on Automation of Software Test (AST '10). Association for Computing Machinery, New York, NY, USA, 24-30. https://doi.org/10.1145/1808266.1808270. (Year: 2010).*
PCT International Search Report and the Written Opinion dated Mar. 24, 2021, issued in related International Application No. PCT/CN2020/137423 (9 pages).

* cited by examiner

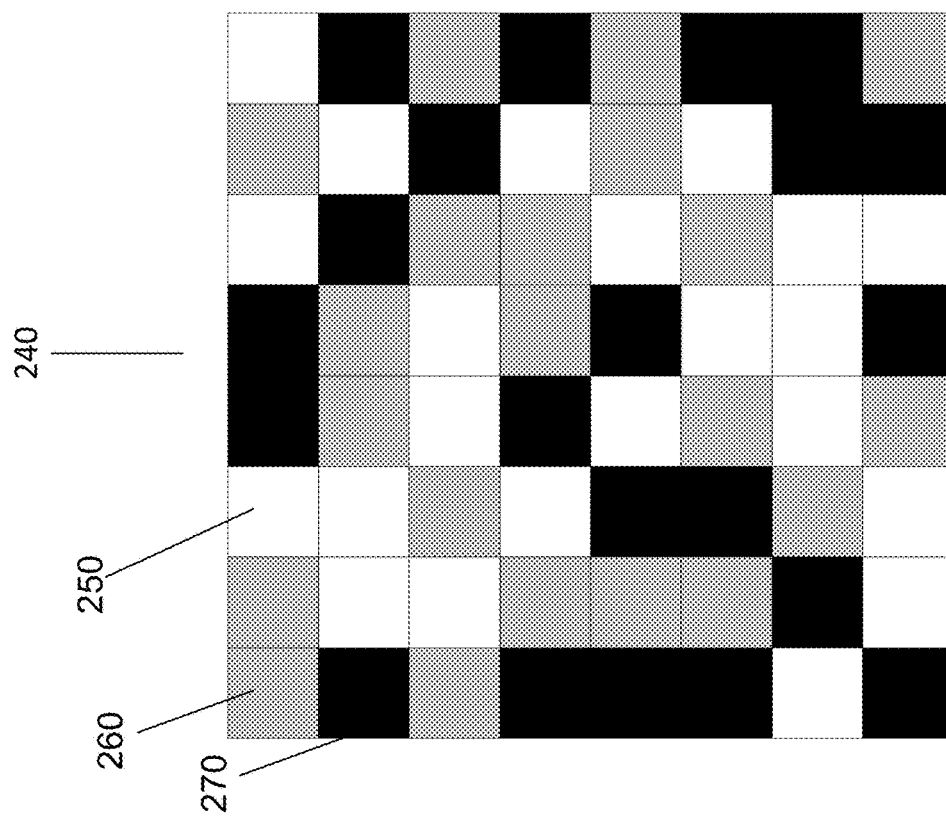
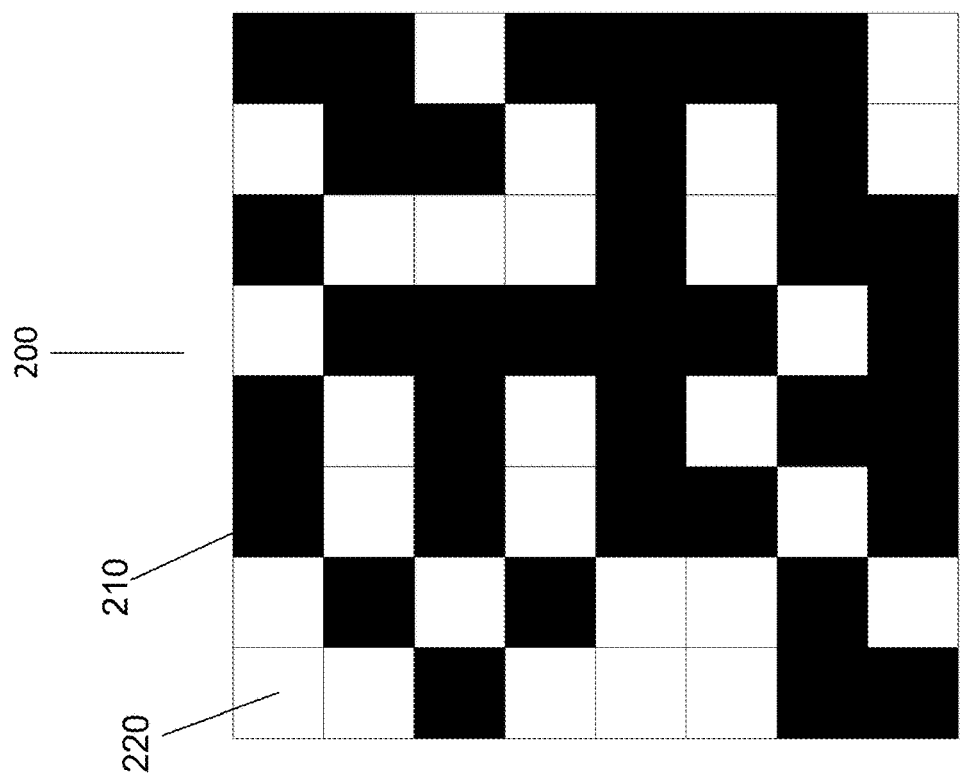
FIG. 2

SYSTEM AND METHOD FOR TESTING MULTIPLE VARIANTS

CROSS-REFERENCE TO RELATED APPLICATION

This application claims the benefit of U.S. Provisional Patent Application No. 62/950,209, filed on Dec. 19, 2019. The entirety of the aforementioned application is incorporated herein by reference.

FIELD OF THE INVENTION

Embodiments of the present invention(s) relate generally to a generalized framework for testing multiple variants among a plurality of testing units.

BACKGROUND

A/B testing, A/B/n testing, and multivariate testing are widely used to test different designs or product features among testing units (e.g., users, sessions, page views, cookies). For example, A/B testing usually splits the testing units into two groups: a control group that keeps using a default design, and a treatment group that uses a new design. The treatment effect (e.g., the effect of the new design) may then be evaluated by comparing the testing results from the two groups. A widely used way to split the testing units into groups is by random splitting. However, one of the prerequisites for concluding the NB testing is that the decisions or behaviors of the testing units are independent. Lacking independence among the testing units may cause certain interference bias (e.g., spatial interference bias) when evaluating the treatment effect. For example, in a ridesharing marketplace, riders may compete for limited driver resources, and drivers may compete for a limited number of riders. The decision of one rider or driver will interfere with the decisions and experiences of others. Thus, it is desirable to provide a system and method for testing multiple variants among a plurality of testing units wherein the decision or behavior of a testing unit may interfere with other units.

SUMMARY

Various embodiments of the specification include, but are not limited to, systems, methods, and non-transitory computer-readable media for testing multiple variants of a to-be-tested feature among a plurality of testing units.

In various implementations, a method for testing a plurality of variants among a plurality of users may include determining a spatial granularity to divide an area into a plurality of grid cells; randomly splitting the plurality of grid cells into a plurality of testing groups, wherein a quantity of the plurality of testing groups is determined based on a quantity of the multiple versions of the feature to be tested; determining a temporal granularity to divide a testing period into a plurality of testing intervals; during each of the plurality of testing intervals, respectively assigning the multiple versions of the feature to the plurality of testing groups by: enabling each of the multiple versions of the feature on one or more of the plurality of computing devices located in the corresponding testing group to collect test data, and rotating the assignment of the multiple versions of the feature from a testing interval to a next testing interval; and obtaining a treatment effect for each of the multiple versions of the feature based on the test data and determining an optimal version of the feature based on the multiple obtained treatment effects.

In some embodiments, the multiple versions of the feature comprise a default version of the feature and at least one new version of the feature.

In some embodiments, the determining a spatial granularity to divide an area comprises: initializing the spatial granularity; dividing the area into a plurality of spatial clusters based on the initialized spatial granularity; randomly splitting the plurality of spatial clusters into a first mega group and a second mega group, wherein the first mega group comprises a plurality of first spatial clusters, and the second mega group comprises a plurality of second spatial clusters; randomly dividing a plurality of individual devices located in the plurality of first spatial clusters into a first treatment group and a first control group; randomly dividing the plurality of second spatial clusters into a second treatment group and a second control group; testing the multiple versions of the feature at an individual-device level in the first treatment group and the first control group to obtain a first treatment effect; testing the multiple versions of the feature at a spatial-cluster level in the second treatment group and the second control group to obtain a second treatment effect; determining whether a difference between the first treatment effect and the second treatment effect is greater than a threshold; in response to determining that the difference is greater than the threshold, increasing the spatial granularity.

In some embodiments, the testing the multiple versions of the feature at an individual-device level in the first treatment group and the first control group to obtain a first treatment effect comprises: enabling a default version of the feature on the individual devices in the control group for a period of time to obtain a first reward; enabling a new version of the feature on the individual devices in the treatment group for the period of time to obtain a second reward; and determining a difference between the first reward and the second reward as the first treatment effect.

In some embodiments, each of the spatial clusters in the second mega group comprises one or more individual devices, and the testing the multiple versions of the feature at a spatial-cluster level in the second treatment group and the second control group to obtain a second treatment effect comprises: enabling a default version of the feature on the individual devices located in the plurality of second spatial clusters in the second control group to obtain a first reward; enabling a new version of the feature on the individual devices located in the plurality of second spatial clusters in the second treatment group to obtain a second reward; and determining a difference between the first reward and the second reward as the second treatment effect.

In some embodiments, the determining a temporal granularity to divide a testing period comprises: initializing the temporal granularity; dividing a period of time into a plurality of intervals, and segmenting the plurality of intervals into a first mega group and a second mega group based on the temporal granularity; for each interval in the first mega group, randomly dividing a plurality of individual devices into a first treatment group and a first control group, and testing the multiple versions of the feature at an individual-device level in the first treatment group and the first control group to obtain a first treatment effect; for each interval in the second mega group, dividing the each interval into a second treatment group and a second control group, and testing the multiple versions of the feature in the second treatment group and the second control group to obtain a second treatment effect; determining whether a difference between the first treatment effect and the second treatment effect is greater than a threshold; in response to determining that the difference is greater than the threshold, increasing the temporal granularity.

In some embodiments, the area is divided into a plurality of grid cells by obtaining a plurality of latitude and longitude tuples of the area from a backend server; mapping the plurality of latitude and longitude tuples into a plurality of grid cells based on the spatial granularity and a closed-form formula for a rectangular grid system, or a Hexagon Mapping application programming interface (API) library.

In some embodiments, the assignment of the multiple versions of the feature to the plurality of testing groups during each of the plurality of testing intervals is stored in a non-volatile storage medium for direct access.

In some embodiments, the assignment of the multiple versions of the feature is rotated from a testing interval to a next testing interval by determining a first initial assignment for a first period, wherein the first period comprises a plurality of first testing intervals, and the assignment of the multiple versions of the feature starts with the first initial assignment and is rotated among the plurality of first testing intervals in a same direction; and rotating the first initial assignment for the first period in the same direction as a second initial assignment for a second period, wherein the second period comprises a plurality of second testing intervals, and the assignment of the multiple versions of the feature starts with the second initial assignment and is rotated among the plurality of second testing intervals in the same direction.

In some embodiments, the feature comprises one of the following: a user interface, a pricing strategy, an order-dispatching strategy, or a new service.

In another aspect of the present disclosure, a computing system may comprise one or more processors and one or more non-transitory computer-readable memories coupled to the one or more processors and configured with instructions executable by the one or more processors. Executing the instructions may cause the system to perform operations. The operations may include determining a spatial granularity to divide an area into a plurality of grid cells; randomly splitting the plurality of grid cells into a plurality of testing groups, wherein a quantity of the plurality of testing groups is determined based on a quantity of the multiple versions of the feature to be tested; determining a temporal granularity to divide a testing period into a plurality of testing intervals; during each of the plurality of testing intervals, respectively assigning the multiple versions of the feature to the plurality of testing groups by: enabling each of the multiple versions of the feature on one or more of the plurality of computing devices located in the corresponding testing group to collect test data, and rotating the assignment of the multiple versions of the feature from a testing interval to a next testing interval; and obtaining a treatment effect for each of the multiple versions of the feature based on the test data and determining an optimal version of the feature based on the multiple obtained treatment effects.

Yet another aspect of the present disclosure is directed to a non-transitory computer-readable storage medium configured with instructions executable by one or more processors to cause the one or more processors to perform operations. The operations may include determining a spatial granularity to divide an area into a plurality of grid cells; randomly splitting the plurality of grid cells into a plurality of testing groups, wherein a quantity of the plurality of testing groups is determined based on a quantity of the multiple versions of the feature to be tested; determining a temporal granularity to divide a testing period into a plurality of testing intervals; during each of the plurality of testing intervals, respectively assigning the multiple versions of the feature to the plurality of testing groups by: enabling each of the multiple versions of the feature on one or more of the plurality of computing devices located in the corresponding testing group to collect test data, and rotating the assignment of the multiple versions of the feature from a testing interval to a next testing interval; and obtaining a treatment effect for each of the multiple versions of the feature based on the test data and determining an optimal version of the feature based on the multiple obtained treatment effects.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which:

FIG. 2 illustrates example diagrams for partitioning a testing area into spatial clusters in accordance with various embodiments.

DETAILED DESCRIPTION

Figure 1:
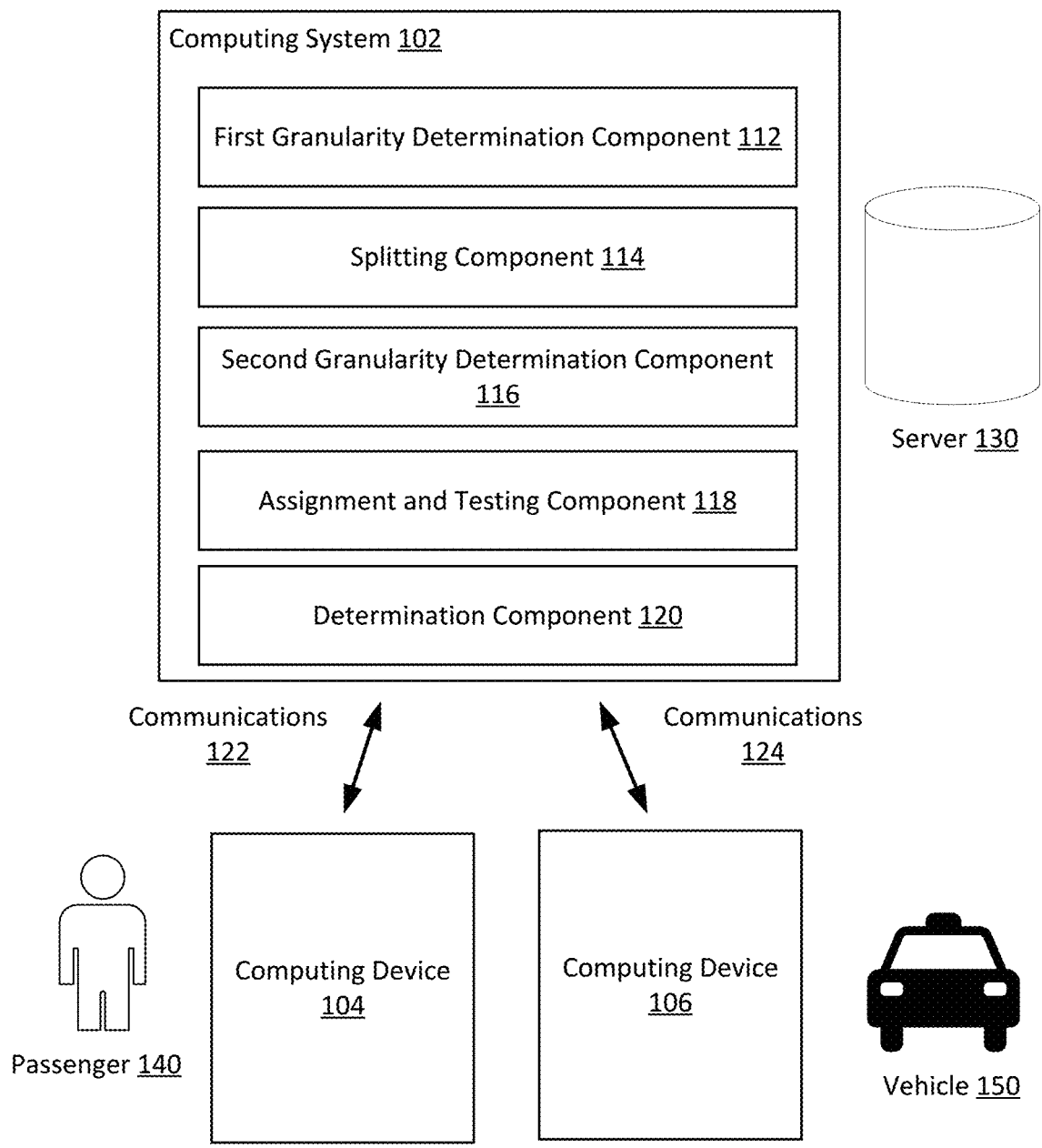
FIG. 1 illustrates an exemplary system to which a spatial-temporal testing may be applied in accordance with various embodiments.

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

In order to reduce the interference bias when testing multiple variants, some testing mechanisms divide the entire testing period into multiple testing intervals and use all the testing units to test one of the variants at each testing interval. This type of testing mechanism is sometimes referred to as Time-Slice Switchback. For example, assuming each testing interval is configured as 12 hours, the test may be designed as Table 1.

| Day | Time Interval | Group |
|---|---|---|
| 1 | 1 | Treatment |
|   | 2 | Control |
| 2 | 1 | Control |
|   | 2 | Treatment |
| 3 | 1 | Treatment |
|   | 2 | Control |
| 4 | 1 | Control |
|   | 2 | Treatment |
| 5 | 1 | Treatment |
|   | 2 | Control |
| 6 | 1 | Control |
|   | 2 | Treatment |
| 7 | 1 | Treatment |
|   | 2 | Control |
| 8 | 1 | Control |
|   | 2 | Treatment |
| ... | ... | ... |

Table 1. Time-slice switchback experiment design with 12-hour time interval

As shown in Table 1, all the users (also referred to testing units) are assigned to the treatment group in the first half of Day 1 (e.g., the first time splice), and to the control group in the second half of Day 1 (e.g., the second time splice). On Day 2, the users are assigned to the control group in the first half of the day, and to the treatment group in the second half of the day. Since different days of the week may influence the testing differently, the duration of time-slice switchback solutions may be configured as a multiple of two weeks. The exemplary design shown in Table 1 may avoid the spatial interference bias mentioned in the background section, but it may still suffer from large variance issues (e.g., any event occurring during a testing interval may disturb the experiment) as well as temporal interference bias between neighboring testing intervals.

This specification discloses a spatial-temporal random segmentation testing method to evaluate treatment effect more accurately for scenarios where the decision or behavior of different testing units affects others. In this specification, the term "variants" may refer to the different versions (e.g., different designs and/or implementations) of a feature to be tested, the different combinations of a plurality of features to be tested, or another suitable format of subjects to be tested. In the context of ride-hailing services, the features may include a pricing strategy, an order-dispatching strategy, a new user interface (e.g., a graphic user interface (GUI)), a new service (carpool, solo, or another type). The terms "user" and "testing unit" may be used interchangeably to refer to a person, a device (a computer, a smartphone, a vehicle, or a smart device), a component of a device, or another suitable object to which the "variants" are tested against. For example, multiple versions of a pricing strategy or multiple different pricing algorithms may be tested against riders (e.g., the users/testing units) in a ride-hailing platform in order to determine the optimal version to be deployed.

In some embodiments, the spatial-temporal random segmentation testing method may design the test based on a plurality of measurements to split the testing units and the testing period. For example, if two measurements are used, the first measurement may be related to one or more spatial features associated with the testing units, and the second measure may refer to time. The one or more spatial features may comprise city, zip code, longitude, latitude, rooms, floors, age, gender, nationality, another suitable feature, or any combination thereof. In some embodiments, the first measurement may determine how to partition a testing space into geospatial units, while the second measurement may be used to partition a testing period into a plurality of testing intervals. In some embodiments, each pair of a geospatial unit and a testing interval may be designated to test one of the variants. That is, the variant may be tested by the testing units located in the geospatial unit during the testing interval. In some embodiments, if the first measurement uses spatial information to partition the testing space, and the second measurement uses temporal information (e.g., 3-hour) to partition a testing period, the method of designing the test may be denoted as a spatial-temporal random partition method.

In some embodiments, the multiple versions of a feature to be tested and evaluated may comprise a default version of the feature, and at least one new version of the feature, where the group running the default version of the feature may be referred to as a control group, and the group(s) running the at least one new version of the features may be referred to as a treatment group(s).

FIG. 1 illustrates an exemplary system 100 to which a spatial-temporal testing may be applied in accordance with various embodiments. The exemplary system 100 may include a computing system 102, a computing device 104, and a computing device 106. It is to be understood that although two computing devices are shown in FIG. 1, any number of computing devices may be included in the system 100. Computing system 102 may be implemented in one or more networks (e.g., enterprise networks), one or more endpoints, one or more servers, or one or more clouds. A server may include hardware or software which manages access to a centralized resource or service in a network. A cloud may include a cluster of servers and other devices that are distributed across a network.

The computing devices 104 and 106 may be implemented on or as various devices such as a mobile phone, tablet, server, desktop computer, laptop computer, vehicle (e.g., car, truck, boat, train, autonomous vehicle, electric scooter, electric bike), etc. The computing system 102 may communicate with the computing devices 104 and 106, and other computing devices. Computing devices 104 and 106 may communicate with each other through computing system 102, and may communicate with each other directly. Communication between devices may occur over the Internet, through a local network (e.g., LAN), or through direct communication (e.g., BLUETOOTH™, radio frequency, infrared).

In some embodiments, the system 100 may include a ride-hailing platform. The ride-hailing platform may facilitate transportation service by connecting drivers of vehicles with passengers. The platform may accept requests for transportation from passengers, identify idle vehicles to fulfill the requests, arrange for pick-ups, and process transactions. For example, passenger 140 may use the computing device 104 to order a trip. The trip order may be included in communications 122. The computing device 104 may be installed with a software application, a web application, an API, or another suitable interface associated with the ride-hailing platform.

While the computing system 102 is shown in FIG. 1 as a single entity, this is merely for ease of reference and is not meant to be limiting. One or more components or one or more functionalities of the computing system 102 described herein may be implemented in a single computing device or multiple computing devices. In some embodiments, the computing system 102 may include a first granularity determination component 112, a splitting component 114, a second granularity determination component 116, an assignment and testing component 118, and a determination component 120.

In some embodiments, the first granularity determination component 112 may be configured to determine a spatial granularity to divide an area into a plurality of grid cells. In some embodiments, determining the spatial granularity may include: initializing a spatial granularity; dividing the area into a plurality of spatial clusters based on the initialized spatial granularity; randomly splitting the plurality of spatial clusters into a first mega group and a second mega group, wherein the first mega group comprises a plurality of first spatial clusters, and the second mega group comprises a plurality of second spatial clusters; randomly dividing a plurality of individual testing units (e.g., users, computing devices) located in the plurality of first spatial clusters into a first treatment group and a first control group; randomly dividing the plurality of second spatial clusters into a second treatment group and a second control group; testing the multiple versions of the features at an individual-unit level in the first treatment group and the first control group to obtain a first treatment effect; testing the multiple versions of the features at a spatial-cluster level in the second treatment group and the second control group to obtain a second treatment effect; determining whether a difference between the first treatment effect and the second treatment effect is greater than a threshold; upon determining the difference being greater than the threshold, increasing the spatial granularity. The above-described iterative process may be performed until an exit condition is satisfied. In some embodiments, such an exit condition may be satisfied when the difference between the first treatment effect and the second treatment effect is not greater than the threshold, or a predetermined number of times. In some embodiments, an area may be divided into a plurality of grid cells based on the spatial granularity (either the initial spatial granularity or the determined spatial granularity) by obtaining a plurality of latitude and longitude tuples of the area from a backend server; mapping the plurality of latitude and longitude tuples into a plurality of grid cells based on the spatial granularity and a closed-form formula for a rectangular grid system, or a Hexagon Mapping application programming interface (API) library.

In some embodiments, the splitting component 114 may be configured to randomly split the plurality of grid cells into a plurality of testing groups, wherein a quantity of the plurality of testing groups is determined based on a quantity of the multiple versions of the feature to be tested. For example, a ride-hailing platform may need to evaluate a plurality of pricing strategy candidates (algorithms) to determine which one to deploy. In this case, the pricing strategy candidates may include the currently used pricing strategy (e.g., the default version) and one or more new pricing strategies (e.g., the new versions). After the entire area for testing the candidates are split into a plurality of grid cells, these grid cells may be randomly split into a plurality of testing groups corresponding to the plurality of pricing strategy candidates. For example, if there are three variants to be tested, the plurality of grid cells may be split into three testing groups, with each testing group testing one of the three variants.

In some embodiments, the second granularity determination component 116 may be configured to determine a temporal granularity to divide a testing period into a plurality of testing intervals. For example, the temporal granularity may be determined by: initializing the temporal granularity; dividing a period of time into a first mega group and a second mega group based on the temporal granularity; for each period in the first mega group, randomly dividing a plurality of individual devices into a first treatment group and a first control group, and testing the multiple versions of the feature at an individual-device level in the first treatment group and the first control group to obtain a first treatment effect; for each period in the second mega group, dividing the each period into a second treatment group and a second control group, and testing the multiple versions of the feature in the second treatment group and the second control group to obtain a second treatment effect determining whether a difference between the first treatment effect and the second treatment effect is greater than a threshold; in response to determining that the difference is greater than the threshold, increasing the temporal granularity.

In some embodiments, the assignment and testing component 118 may be configured to respectively assign the multiple versions of the feature to the plurality of testing groups during each of the plurality of testing intervals by enabling each of the multiple versions of the feature on one or more of the plurality of testing units (e.g., computing devices, phones) located in the corresponding testing group to collect test data, and rotating the assignment of the multiple versions of the feature from a testing interval to a next testing interval.

For example, the multiple versions of the features to be tested may be assigned by determining a first initial assignment for a first period, wherein the first period comprises a plurality of first testing intervals, and the assignment of the multiple versions of the feature starts with the first initial assignment and is rotated among the plurality of first testing intervals in a same direction; and rotating the first initial assignment for the first period in the same direction as a second initial assignment for a second period, wherein the second period comprises a plurality of second testing intervals, and the assignment of the multiple versions of the feature starts with the second initial assignment and is rotated among the plurality of second testing intervals in the same direction.

In some embodiments, the determination component 120 may be configured to obtain a treatment effect for each of the multiple versions of the feature based on the test data and determine an optimal version of the feature based on the multiple obtained treatment effects. The testing results may reflect how the testing units/users react to the multiple versions of the feature. The ride-hailing platform may determine the optimal version as the deployment candidate.

FIG. 2 illustrates example diagrams for partitioning a testing area into spatial clusters in accordance with various embodiments. The example diagrams in FIG. 2 may involve one or more steps in the spatial-temporal random partition method, and may be implemented by the computing system 102 in FIG. 1. As shown in FIG. 2, a 2D space 200 for executing a test may be partitioned into a plurality of grid cells (e.g., squares) based on a spatial granularity (e.g., size of each grid cell). The plurality of grid cells in 200 may represent a plurality of small regions of the 2D space. In some embodiments, besides using grid cells in a square shape to partition the 2D space shown in FIG. 2, other shapes may be used as well, such as a rectangle, triangle, hexagon, another suitable shape, or any combination thereof. As shown in FIG. 2, the plurality of small grid cells in 200 may be split into two spatial clusters, corresponding to two testing groups: a control group and a treatment group. For example, black grid cells 210 belong to one group, and white grid cells 220 belong to the other group. These two groups may be used to test two variants (e.g., two versions of a software/feature release) simultaneously. The testing units located within a grid cell may be assigned the corresponding variant to test (e.g., users located in a grid cell of a treatment group may receive the new version of the software to test).

In some embodiments, the plurality of grid cells may be split into more than two spatial clusters (e.g., testing groups) as needed. The number of spatial clusters may be related to the number of variants to be tested. For example, if there are three variants to be tested, the testing units may be split into three spatial clusters, with each cluster testing one variant at a time. As shown in FIG. 2, a 2D space 240 may be split into a plurality of grid cells. These grid cells may be randomly divided into three spatial clusters: a first cluster comprising all white grid cells 250, a second cluster comprising all grey grid cells 260, and a third cluster comprising all black grid cells 270. These three clusters may test the three variants (e.g., three versions) at the same time.

In some embodiments, the space to be partitioned into small regions (e.g., grid cells) may have more than two dimensions. In this case, the spatial granularity may comprise multiple dimensions, such as a latitude dimension, a longitude dimension, and an altitude dimension, or another suitable dimension. For example, a multi-story building may be a 3D space and may be partitioned into grid cells based on floors/levels and locations (e.g., rooms, coordinates) on each floor.

Figure 3:
FIG. 3 illustrates an example diagram for determining testing intervals in accordance with various embodiments.

FIG. 3 illustrates an example diagram for determining testing intervals in accordance with various embodiments. The example diagram used in FIG. 3 may involve one or more steps in the spatial-temporal random partition method and may be implemented by the computing system 102 in FIG. 1. The testing period 300 in FIG. 3 may be partitioned in different ways, such as using a coarse-grained time interval shown in 320, a fine-grained time interval shown in 330, another suitable time interval, or any combination thereof. In some embodiments, the testing period 300 may be determined first, and then the testing interval (e.g., either 320 or 330) may be derived based on the duration of the testing period and the number of variants to be tested. In some embodiments, the length of each testing interval (e.g., either 320 or 330) may be determined first, then the entire testing period 300 may be derived based on the length of the each testing interval and the number of variants to be tested. In some embodiments, the testing intervals may or may not be uniform in duration. For example, the lengths of the testing intervals may be 3-hour, 6-hour, 24-hour, another suitable duration, or any combination thereof.

Referring back to the 2D space 200 in FIG. 2, if a test were to run in this 2D space to test two variants (e.g., two different versions of a feature/design/release), and the testing interval was determined as 12 hours, the test may be designed as shown in the following table 2 according to the spatial-temporal random partition method.

TABLE 2

An example of spatial-temporal random segmentation experiment design

| Day | Time Interval | White Cluster/Group | Black Cluster/Group |
|---|---|---|---|
| 1 | 1 | Treatment | Control |
|   | 2 | Control | Treatment |
| 2 | 1 | Control | Treatment |
|   | 2 | Treatment | Control |
| 3 | 1 | Treatment | Control |
|   | 2 | Control | Treatment |
| 4 | 1 | Control | Treatment |
|   | 2 | Treatment | Control |
| 5 | 1 | Treatment | Control |
|   | 2 | Control | Treatment |
| 6 | 1 | Control | Treatment |
|   | 2 | Treatment | Control |
| 7 | 1 | Treatment | Control |
|   | 2 | Control | Treatment |
| 8 | 1 | Control | Treatment |
|   | 2 | Treatment | Control |
| ... | ... | ... | ... |

In the above example, the two versions of the feature may include a default version of the feature and a new version of the feature. The "default" version may refer to a currently deployed version, and the "new" version may refer to a to-be-tested version. In some cases, if the new version performs better than the default version, the new version may be deployed to replace the default version.

Referring back to the 2D space 240 in FIG. 2, if a test were to run in this 2D space to test three variants (e.g., three different versions of a feature), and the testing interval was determined as 24 hours, the test design may be shown in the following Table 3.

TABLE 3

An example of spatial-temporal random segmentation experiment design

| Day | Testing interval | White Cluster/Group | Grey Cluster/Group | Black Cluster/Group |
|---|---|---|---|---|
| 1 | 1 | Version 1 | Version 2 | Version 3 |
| 2 | 1 | Version 3 | Version 1 | Version 2 |
| 3 | 1 | Version 2 | Version 3 | Version 1 |
| 4 | 1 | Version 1 | Version 2 | Version 3 |
| 5 | 1 | Version 3 | Version 1 | Version 2 |
| 6 | 1 | Version 2 | Version 3 | Version 1 |
| 7 | 1 | Version 1 | Version 2 | Version 3 |
| 8 | 1 | Version 3 | Version 1 | Version 2 |
| ... | ... | ... | ... | ... |

In some embodiments, the duration of the spatial-temporal random partition method to test N variants may be K×N weeks, $K \in (1, 2, 3, \dots)$. The N weeks cycle may guarantee one full-week data for each version in each spatial cluster (e.g., testing group).

Figure 4:
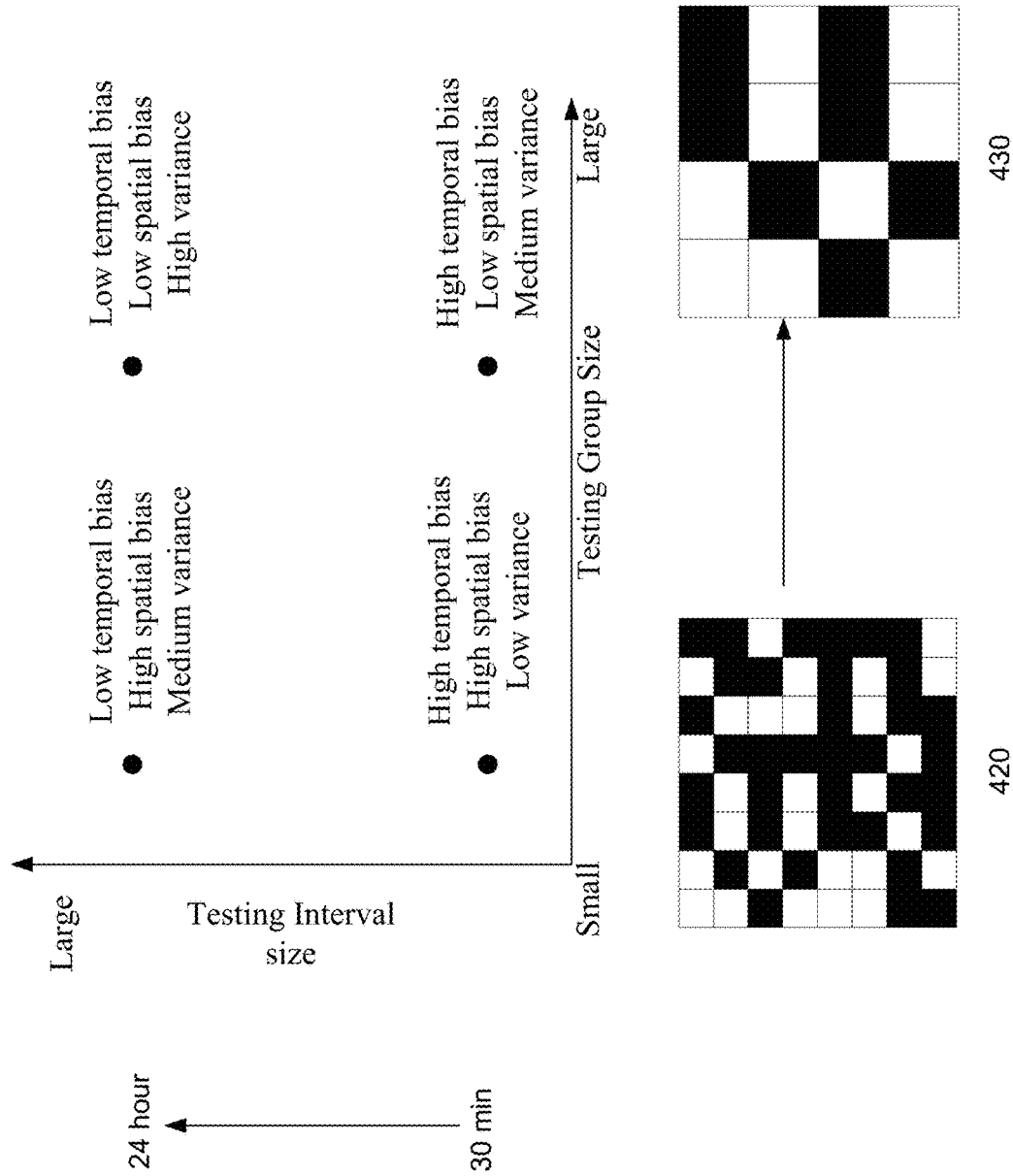
FIG. 4 illustrates an exemplary chart showing tradeoffs of using different granularities for partitioning a testing space and a testing period in accordance with various embodiments.

FIG. 4 illustrates an exemplary chart showing tradeoffs of using different granularities for partitioning a testing space and a testing period in accordance with various embodiments. When the spatial granularity (e.g., the size of the grid cells) partitioning the testing space is small, the testing units within a grid cell may be less likely to suffer from large variance issues because it is less likely to have variance within smaller physical regions. However, a small spatial granularity may result in a large number of grid cells, which in turn may lead to high spatial interference bias among the neighboring grid cells. Similarly, when the temporal granularity (e.g., length, duration) of the testing intervals is small, the testing results collected from each testing intervals may be less likely to suffer from large variance issues, but may subject to a high temporal interference bias between the neighboring testing intervals. The chart shown in FIG. 4 illustrates the tradeoffs between the four example combinations of grid cell size (e.g., small and large) and testing interval size (e.g., small/short and large/long).

In some embodiments, in order to find the optimal spatial and temporal granularities for the grid cell and the testing interval for a testing task, one or more preliminary experiments may be performed in order to determine the testing units' sensitivities to spatial interference bias and temporal interference bias.

In some embodiments, the process may start with choosing an initial granularity for the grid cell and an initial length for the testing interval, which is usually small for small variation purposes. For example, the initial granularity for the grid cell may include 200-meter grid widths for square grid cells, and the initial length for the testing interval may include 30-minute testing intervals. Then two experiments may be conducted to examine the testing units' sensitivities to the spatial interference bias and the temporal interference bias. These two experiments may be conducted sequentially or in parallel.

For the first experiment focusing on the spatial interference bias, an area may be partitioned into a plurality of spatial clusters (referring to the grid cells in 420) based on the initial granularity. In some embodiments, the spatial clusters may further be clustered into two mega groups, such as the black grid cells (a first mega group) and white grid cells (a second mega group) in 420, where the first mega group comprises a plurality of first spatial clusters, and the second mega group comprises a plurality of second spatial clusters. In some embodiments, the following operations may be performed in order to determine the testing units' sensitivities to spatial interference bias: randomly dividing a plurality of individual devices located in the plurality of first spatial clusters into a first treatment group and a first control group; randomly dividing the plurality of second spatial clusters into a second treatment group and a second control group; testing the multiple versions of the feature at an individual-device level in the first treatment group and the first control group to obtain a first treatment effect; testing the multiple versions of the feature at a spatial-cluster level in the second treatment group and the second control group to obtain a second treatment effect; determining whether a difference between the first treatment effect and the second treatment effect is greater than a threshold. If the difference is greater than a threshold, it means the testing units are sensitive to the spatial interference bias, and thus the spatial granularity may be increased to reduce the spatial interference bias.

For example, each individual testing unit (e.g., a user, a session, a device) located in the spatial clusters of the first mega group may be randomly assigned into treatment or control groups (e.g., two individual testing units within the same spatial cluster may be assigned to different groups). Assuming a default version and a new version of a feature are being tested, the default version of the feature may be enabled on the testing units of the control group to obtain a first reward, and the new version of the feature may be enabled on the testing units of the treatment group to obtain a second reward. The difference between the first reward and the second reward may be referred to as the treatment effect of the first mega group.

For the other mega group, spatial cluster-level testing may be performed. For example, the spatial clusters may be randomly split into treatment or control groups (e.g., two individual testing units within the same spatial cluster may always be assigned to same groups). Still assuming the default version and the new version of the feature are being tested, the default version of the feature may be enabled on the testing units located in the spatial clusters of the control group to obtain a first reward, and the new version of the feature may be enabled on the testing units located in the spatial clusters of the treatment group to obtain a second reward. The difference between the first reward and the second reward may be referred to as the treatment effect of the second mega group.

In some embodiments, if the difference between the treatment effects of the two mega groups is larger than a criterion value E, the spatial interference bias using the initial spatial granularity is significant. In this case, the initial spatial granularity (the size for the grid cell) may be adjusted to a bigger size. As shown, comparing to 420 with smaller grid cells or a finer granularity, the area may be partitioned into 430 with larger grid cells or a coarser granularity to reduce the spatial interference bias.

In some embodiments, during the experiment focusing on the temporal interference bias, the testing period may be divided into two mega groups with "switching back" between different days based on an initial temporal granularity. For example, the period of time for testing may be divided into a plurality of intervals, which may be segmented into a first mega group and a second mega group based on the initial temporal granularity. In order to determine the testing units' sensitivities to temporal interference bias, the following operations may be performed: for each interval in the first mega group, randomly dividing a plurality of individual devices into a first treatment group and a first control group, and testing the multiple versions of the feature at an individual-device level in the first treatment group and the first control group to obtain a first treatment effect; for each interval in the second mega group, dividing the each interval into a second treatment group and a second control group, and testing the multiple versions of the feature in the second treatment group and the second control group to obtain a second treatment effect; determining whether a difference between the first treatment effect and the second treatment effect is greater than a threshold; and in response to determining that the difference is greater than the threshold, increasing the spatial granularity.

For example, if day 1 is assigned to mega group 1, then day 2 may be assigned to mega group 2, and day 3 may be assigned to mega group 1, etc. In some embodiments, each individual testing unit (e.g., a user, a session) within mega group 1 may be randomly assigned into treatment or control groups (e.g., individual-level testing). Each treatment or control group in mega group 1 may generate a reward. For example, assuming the two versions of a to-be-tested feature includes a default version and a new version, the default version may be enabled on the computing devices in the control groups to generate a first set of rewards, and the new version may be enabled on the computing devices in the treatment groups to generate a second set of rewards. The difference between the two sets of rewards generated by the control group(s) and the rewards generated by the treatment group(s) in mega group 1 may be referred to as a treatment effect of mega group 1.

For mega group 2 comprising a plurality of testing intervals, all testing units (individual devices, sessions, users) during first testing interval may be assigned to the control group, all testing units during the second testing interval may be assigned to the treatment group, etc. In some embodiments, each treatment or control group in mega group 2 may generate a reward. The difference between the rewards generated by the control group(s) and the rewards generated by the treatment group(s) in mega group 2 may be referred to as a treatment effect of mega group 2. In some embodiments, if the difference between the treatment effects of the two mega groups is significantly larger than a criterion value £, the temporal interference bias using the initial temporal granularity may be deemed as significant. In this case, the testing intervals may be increased to reduce the temporal interference bias. For example, the testing intervals may be gradually increased from 30 minutes up to 24 hours.

In some embodiments, if the biases are not significant, the initial sizes may be adopted for the test. Otherwise, the process may increase the corresponding size (e.g., grid cell size, or testing interval length) and repeat the above experiments until optimal sizes are found.

Figure 5:
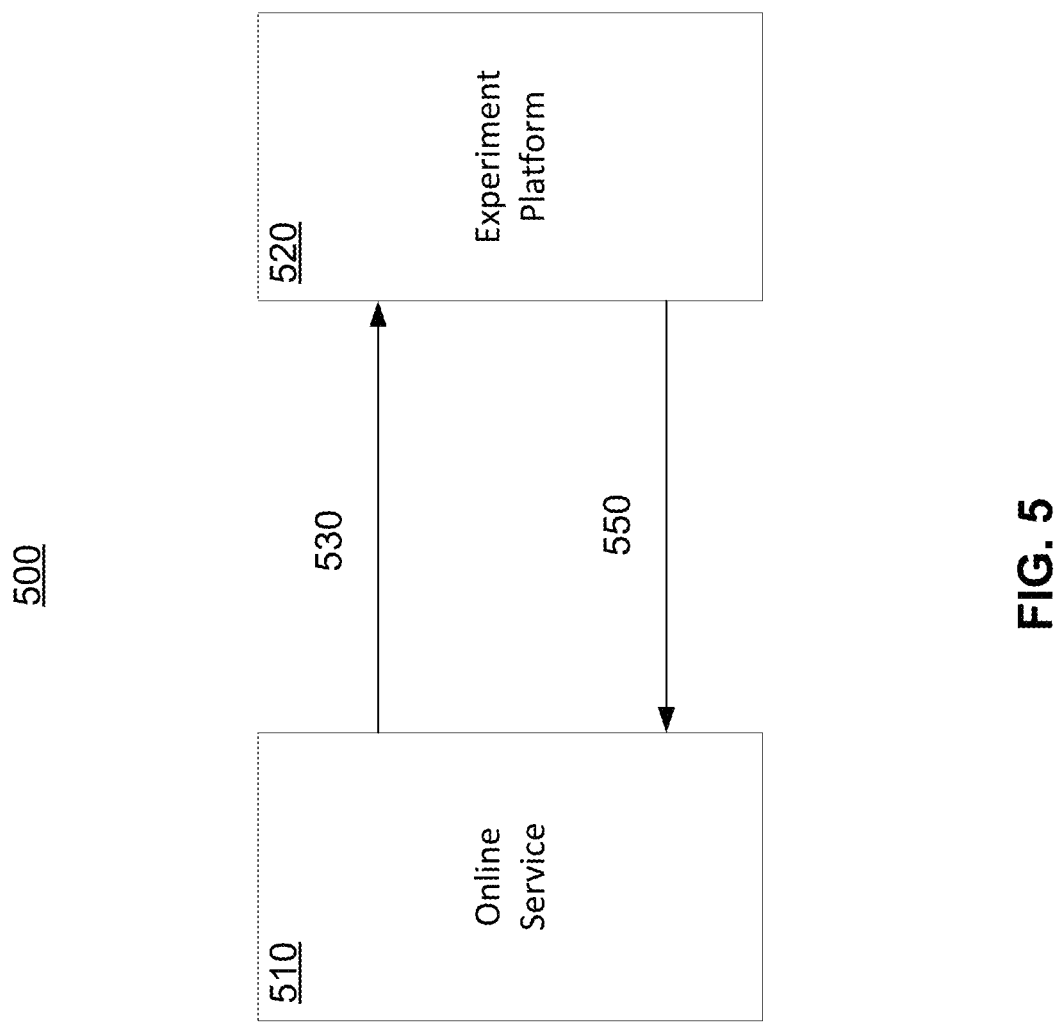
FIG. 5 illustrates an exemplary system flow for testing a plurality of variants among a plurality of testing units in accordance with various embodiments.

FIG. 5 illustrates an exemplary system 500 flow for testing a plurality of variants among a plurality of testing units in accordance with various embodiments. In some embodiments, the system 500 may comprise an online service 510, an experiment platform 520, and communication channels 530 and 550 between the online service and the experiment platform. In some embodiments, the online service 510 may be a backend service that serves the variants to be tested. The upstream of the online service 510 may be another backend service or a customer-facing front-end (e.g., web, or mobile). In some embodiments, the online service 510 may pass one or more parameters associated with a testing unit to the experiment platform 520 to inquire which variant to be tested by the testing unit. In some embodiments, the one or more parameters may comprise a timestamp, and a location information tuple (e.g., a latitude-longitude pair in a 2D environment, or a latitude/longitude/elevation tuple in a 3D environment). In some embodiments, the experiment platform 520 may map the one or more parameters into a spatial cluster (e.g., testing group) and a testing interval, which may then suggest which variant should be tested by the testing unit.

For example, the online service 510 may need to decide which version of a pricing strategy needs to be enabled on a computing device of a user. The online service 510 may send a query through channel 530 with temporal information (e.g., a duration within which the pricing strategy needs to be enabled) and spatial information (e.g., location information of the user). The input timestamp may be mapped by the experiment platform 520 to a specific testing interval, and the latitude-longitude pair may be mapped by the experiment platform 520 to a grid cell, which may indicate which testing group the grid cell falls in. Based on the testing interval and the testing group, the experiment platform 520 may then determine which version of the pricing unit needs to be tested by the user and return such result to the online service 510 through channel 550. In some embodiments, the mapping between the plurality of versions of variants and the combinations of testing intervals and testing groups may be pre-calculated and stored in memory or database to avoid repetitive calculations.

The pre-calculation process of the mapping may be implemented as a software, an algorithm, a program, a binary, another type of computer-implemented process, or any combination thereof. For example, if the testing space is a 2D space partitioned into a plurality of grid cells (e.g., based on the spatial granularity determined by the preliminary experiments described in FIG. 4), the pre-calculation process may start with assigning the plurality of grid cells into testing groups (e.g., assuming the plurality of grid cells refer to the small grid cells shown in FIG. 2, a testing group may correspond to a group of grid cells of the same color in FIG. 2) using formula (1).

$$\text{testing group} = h(\text{small\_region}) \% \text{num\_groups} \quad (1)$$

where small_region may refer to the location information or identifier of the corresponding grid cell; $h(\cdot)$ may refer to a hash function, e.g., MD5; num_groups may refer to the number of testing groups, wherein each testing group may test one of the variants to be tested (e.g., versions of a feature); and "%" may refer to a modulo operator.

The pre-calculation process may proceed to assign the plurality of variants to be tested to the testing groups. In some embodiments, the "assigning of a variant" may refer to enabling a version of a feature on a computing device (e.g., smartphone, or a device with a specific account) to test the user's reaction to the feature. For example, if there are three versions of a feature 1, 2, 3 to be tested, and three corresponding testing groups A, B, C, the pre-calculation process may initialize the assignment for the first testing interval of a first period as $(1, 2, 3) <= (A, B, C)$, which indicate the users in testing group A will test version 1, users in testing group B will test version 2, and users in testing group C will test version 3. For simplicity, the first period here refers to a first day. This assignment may be denoted as a variable "initial_assignment_previous_day." The value of this variable may not be changed until the second day (also called second period). For the second testing interval of the same day (e.g., the first day), the process may rotate the assignment from the previous testing interval by one slot. The rotation direction may be right or left, e.g., if right rotation is chosen, the assignment for the second testing interval may be $(1, 2, 3) <= (C, A, B)$. Similarly, the assignment may rotate by one slot for every next testing interval of the same day, until the first day is finished.

For the second day, the pre-calculation process may initialize the assignment for the first testing interval by rotating the "initial_assignment_previous_day" in the same rotation direction in the first day. For example, since "initial_assignment_previous_day" from the first day is $(1, 2, 3) <= (A, B, C)$, the initial assignment for the first testing interval of the second day may be $(1, 2, 3) <= (C, A, B)$. Then the process may repeat the rotation for every next testing interval of the same day until the second day is finished. The pre-calculation process may repeat this process for the following days till the end of the testing period.

Figure 6:
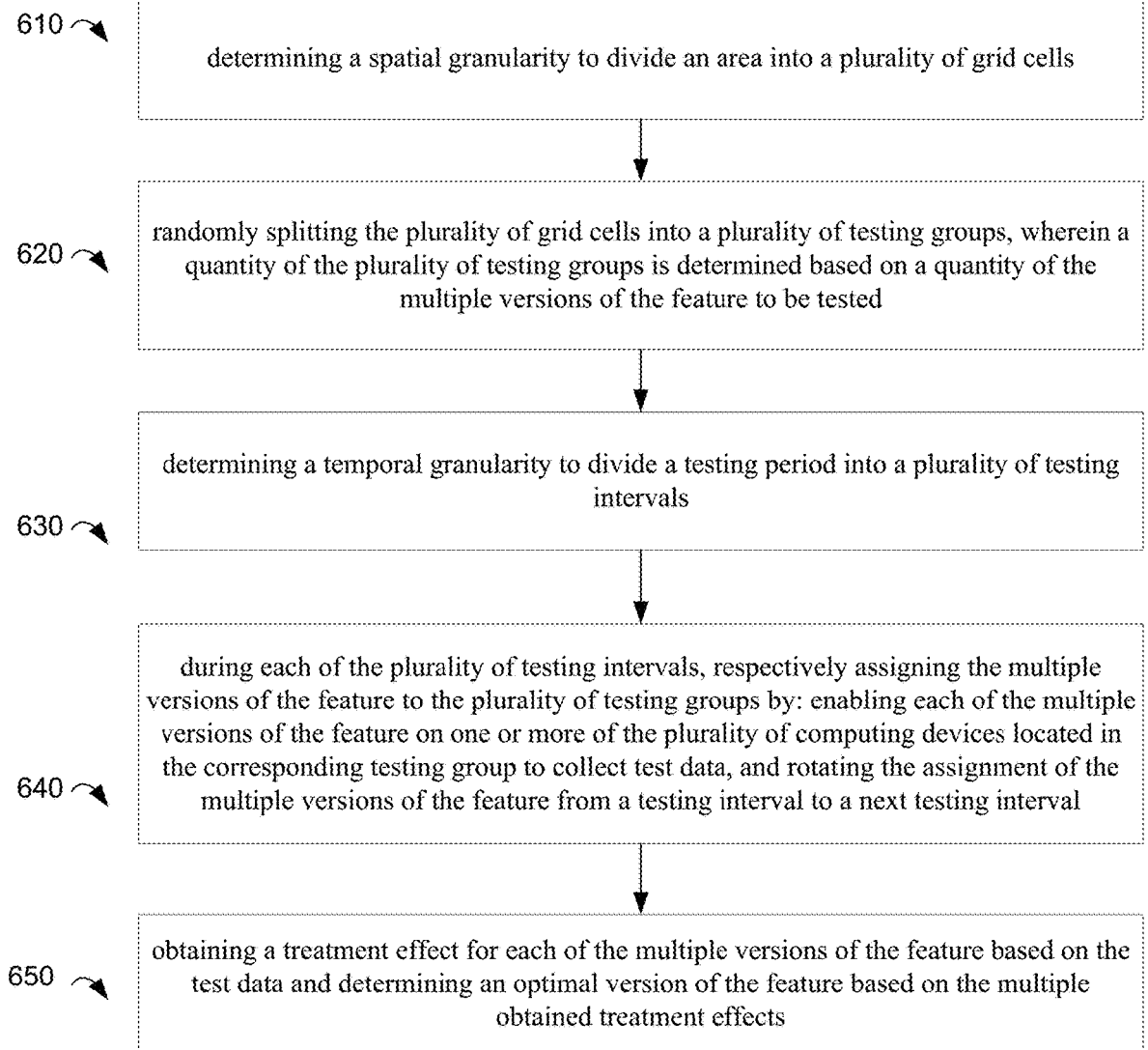
FIG. 6 illustrates an exemplary method for testing a plurality of variants among a plurality of testing units in accordance with various embodiments.

FIG. 6 illustrates an exemplary method 600 for testing a plurality of variants among a plurality of testing units in accordance with various embodiments. The method 600 may be implemented in an environment shown in FIG. 1. The method 600 may be performed by a device, apparatus, or system illustrated by FIGS. 1-5, such as the system 102. Depending on the implementation, the method 600 may include additional, fewer, or alternative steps performed in various orders or in parallel.

Block 610 includes determining a spatial granularity to divide an area into a plurality of grid cells.

Block 620 includes randomly splitting the plurality of grid cells into a plurality of testing groups, wherein a quantity of the plurality of testing groups is determined based on a quantity of the multiple versions of the feature to be tested.

Block 630 includes determining a temporal granularity to divide a testing period into a plurality of testing intervals.

Block 640 includes during each of the plurality of testing intervals, respectively assigning the multiple versions of the feature to the plurality of testing groups by: enabling each of the multiple versions of the feature on one or more of the plurality of computing devices located in the corresponding testing group to collect test data, and rotating the assignment of the multiple versions of the feature from a testing interval to a next testing interval.

Block 650 includes obtaining a treatment effect for each of the multiple versions of the feature based on the test data and determining an optimal version of the feature based on the multiple obtained treatment effects.

Figure 7:
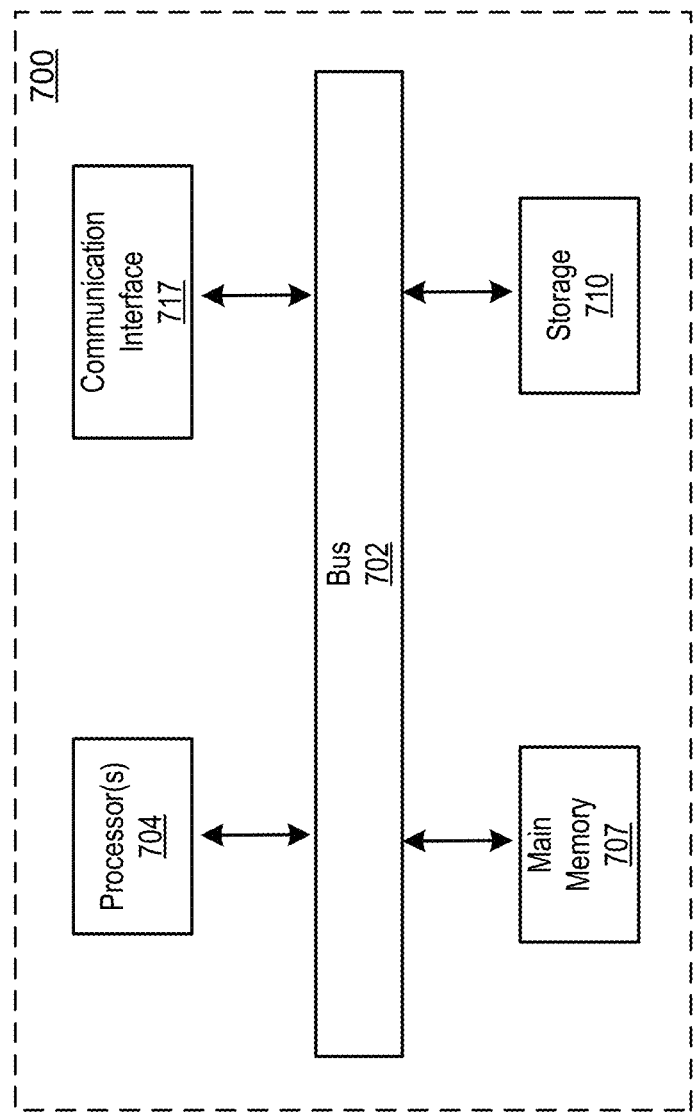
FIG. 7 is a block diagram that illustrates a computer system upon which any of the embodiments described herein may be implemented, in accordance with some embodiments.

FIG. 7 illustrates an example computing device in which any of the embodiments described herein may be implemented. The computing device may be used to implement one or more components of the systems and the methods shown in FIGS. 1-6. The computing device 700 may comprise a bus 702 or other communication mechanism for communicating information and one or more hardware processors 704 coupled with bus 702 for processing information. Hardware processor(s) 704 may be, for example, one or more general purpose microprocessors.

The computing device 700 may also include a main memory 707, such as a random-access memory (RAM), cache and/or other dynamic storage devices 710, coupled to bus 702 for storing information and instructions to be executed by processor(s) 704. Main memory 707 also may be used for storing temporary variables or other intermediate information during execution of instructions to be executed by processor(s) 704. Such instructions, when stored in storage media accessible to processor(s) 704, may render computing device 700 into a special-purpose machine that is customized to perform the operations specified in the instructions. Main memory 707 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 700 may implement the techniques described herein using customized hard-wired logic, one or more ASICs or FPGAs, firmware and/or program logic which in combination with the computing device may cause or program computing device 700 to be a special-purpose machine. According to one embodiment, the techniques herein are performed by computing device 700 in response to processor(s) 704 executing one or more sequences of one or more instructions contained in main memory 707. Such instructions may be read into main memory 707 from another storage medium, such as storage device 710. Execution of the sequences of instructions contained in main memory 707 may cause processor(s) 704 to perform the process steps described herein. For example, the processes/methods disclosed herein may be implemented by computer program instructions stored in main memory 707. When these instructions are executed by processor(s) 704, they may perform the steps as shown in corresponding figures and described above. In alternative embodiments, hard-wired circuitry may be used in place of or in combination with software instructions.

The computing device 700 also includes a communication interface 717 coupled to bus 702. Communication interface 717 may provide a two-way data communication coupling to one or more network links that are connected to one or more networks. As another example, communication interface 717 may be a local area network (LAN) card to provide a data communication connection to a compatible LAN (or WAN component to communicate with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method for testing multiple versions of a Graphic User Interface (GUI) on a plurality of computing devices, comprising:
   determining, by a computing device, a spatial granularity to divide an area into a plurality of grid cells;
   randomly splitting, by the computing device, the plurality of grid cells into a plurality of testing groups using an application programming interface (API) library, wherein a quantity of the plurality of testing groups is determined based on a quantity of the multiple versions of the GUI to be tested;
   determining, by the computing device, a temporal granularity to divide a testing period into a plurality of testing intervals;
   during each of the plurality of testing intervals, respectively assigning, by the computing device, the multiple versions of the GUI to the plurality of testing groups through an online service, wherein the assigning comprises:
      enabling, by the computing device through the online service, a first version of the GUI on one or more web application or mobile application of a user device located in a first testing group to collect test data during a first testing interval, and
      rotating, by the computing device through the online service, the assignment of the multiple versions of the GUI for a next testing interval, wherein the rotating comprises (1) disabling the first version of the GUI on one or more web application or mobile application of the user device located in the first testing group and (2) enabling the first version of the GUI on one or more web application or mobile application of a user device located in a second testing group during the next testing interval;
   obtaining, by the computing device through the online service, the test data for each of the multiple versions of the GUI; and
   determining, by the computing device, an optimal version of the GUI based on the test data.

2. The method of claim 1, wherein the multiple versions of the GUI comprise a default version of the GUI, and at least one new version of the GUI.

3. The method of claim 1, wherein the determining a spatial granularity to divide an area comprises:
   initializing the spatial granularity;
   dividing the area into a plurality of spatial clusters based on the initialized spatial granularity;
   randomly splitting the plurality of spatial clusters into a first mega group and a second mega group, wherein the first mega group comprises a plurality of first spatial clusters, and the second mega group comprises a plurality of second spatial clusters;
   randomly dividing a plurality of individual devices located in the plurality of first spatial clusters into a first treatment group and a first control group;
   randomly dividing the plurality of second spatial clusters into a second treatment group and a second control group;
   testing the multiple versions of the GUI at an individual-device level in the first treatment group and the first control group to obtain a first test data;
   testing the multiple versions of the GUI at a spatial-cluster level in the second treatment group and the second control group to obtain a second test data;
   determining whether a difference between the first test data and the second test data is greater than a threshold;
   in response to determining that the difference is greater than the threshold, increasing the spatial granularity.

4. The method of claim 3, wherein the testing the multiple versions of the GUI at an individual-device level in the first treatment group and the first control group to obtain a first test data comprises:
   enabling a default version of the GUI on the individual devices in the control group for a period of time to obtain a first reward;
   enabling a new version of the GUI on the individual devices in the treatment group for the period of time to obtain a second reward; and
   determining a difference between the first reward and the second reward as the first test data.

5. The method of claim 3, wherein each of the spatial clusters in the second mega group comprises one or more individual devices, and
   the testing the multiple versions of the GUI at a spatial-cluster level in the second treatment group and the second control group to obtain a second test data comprises:
   enabling a default version of the GUI on the individual devices located in the plurality of second spatial clusters in the second control group to obtain a first reward;
   enabling a new version of the GUI on the individual devices located in the plurality of second spatial clusters in the second treatment group to obtain a second reward; and
   determining a difference between the first reward and the second reward as the second test data.

6. The method of claim 1, wherein the determining a temporal granularity to divide a testing period comprises:
   initializing the temporal granularity;
   dividing a period of time into a plurality of intervals, and segmenting the plurality of intervals into a first mega group and a second mega group based on the temporal granularity;
   for each interval in the first mega group, randomly dividing a plurality of individual devices into a first treatment group and a first control group, and testing the multiple versions of the GUI at an individual-device level in the first treatment group and the first control group to obtain a first test data;
   for each interval in the second mega group, dividing the each interval into a second treatment group and a second control group, and testing the multiple versions of the GUI in the second treatment group and the second control group to obtain a second test data;
   determining whether a difference between the first test data and the second test data is greater than a threshold;
   in response to determining that the difference is greater than the threshold, increasing the temporal granularity.

7. The method of claim 1, wherein the area is divided into a plurality of grid cells by:
   obtaining a plurality of latitude and longitude tuples of the area from a backend server;
   mapping the plurality of latitude and longitude tuples into a plurality of grid cells based on the spatial granularity and a closed-form formula for a rectangular grid system, or a Hexagon Mapping application programming interface (API) library.

8. The method of claim 1, wherein the assignment of the multiple versions of the GUI to the plurality of testing groups during each of the plurality of testing intervals is stored in a non-volatile storage medium for direct access.

9. The method of claim 1, wherein the GUI is related to one of the following functionalities: a pricing strategy, an order-dispatching strategy, or a new service.

10. A system comprising one or more processors and one or more non-transitory computer-readable memories coupled to the one or more processors, the one or more non-transitory computer-readable memories storing instructions that, when executed by the one or more processors, cause the system to perform operations comprising:
 determining a spatial granularity to divide an area into a plurality of grid cells;
 randomly splitting the plurality of grid cells into a plurality of testing groups using an application programming interface (API) library, wherein a quantity of the plurality of testing groups is determined based on a quantity of multiple versions of a Graphic User Interface (GUI) to be tested;
 determining a temporal granularity to divide a testing period into a plurality of testing intervals;
 during each of the plurality of testing intervals, respectively assigning the multiple versions of the GUI to the plurality of testing groups through an online service, wherein the assigning comprises:
  enabling, through the online service, a first version of the GUI on one or more web application or mobile application of a user device located in a first testing group to collect test data during a first testing interval, and
  rotating, through the online service, the assignment of the multiple versions of the GUI for a next testing interval, wherein the rotating comprises (1) disabling the first version of the GUI on one or more web application or mobile application of the user device located in the first testing group and (2) enabling the first version of the GUI on one or more web application or mobile application of a user device located in a second testing group during the next testing interval;
 obtaining the test data for each of the multiple versions of the GUI; and
 determining an optimal version of the GUI based on the test data.

11. The system of claim 10, wherein the multiple versions of the GUI comprise a default version of the GUI, and at least one new version of the GUI.

12. The system of claim 10, wherein the determining a spatial granularity to divide an area comprises:
 initializing the spatial granularity;
 dividing the area into a plurality of spatial clusters based on the initialized spatial granularity;
 randomly splitting the plurality of spatial clusters into a first mega group and a second mega group, wherein the first mega group comprises a plurality of first spatial clusters, and the second mega group comprises a plurality of second spatial clusters;
 randomly dividing a plurality of individual devices located in the plurality of first spatial clusters into a first treatment group and a first control group;
 randomly dividing the plurality of second spatial clusters into a second treatment group and a second control group;
 testing the multiple versions of the GUI at an individual-device level in the first treatment group and the first control group to obtain a first test data;
 testing the multiple versions of the GUI at a spatial-cluster level in the second treatment group and the second control group to obtain a second test data;
 determining whether a difference between the first test data and the second test data is greater than a threshold;
 in response to determining that the difference is greater than the threshold, increasing the spatial granularity.

13. The system of claim 12, wherein the testing the multiple versions of the GUI at an individual-device level in the first treatment group and the first control group to obtain a first test data comprises:
 enabling a default version of the GUI on the individual devices in the control group for a period of time to obtain a first reward;
 enabling a new version of the GUI on the individual devices in the treatment group for the period of time to obtain a second reward; and
 determining a difference between the first reward and the second reward as the first test data.

14. The system of claim 12, wherein the determining a temporal granularity to divide a testing period comprises:
 initializing the temporal granularity;
 dividing a period of time into a plurality of intervals, and segmenting the plurality of intervals into a first mega group and a second mega group based on the temporal granularity;
 for each interval in the first mega group, randomly dividing a plurality of individual devices into a first treatment group and a first control group, and testing the multiple versions of the GUI at an individual-device level in the first treatment group and the first control group to obtain a first test data;
 for each interval in the second mega group, dividing the each interval into a second treatment group and a second control group, and testing the multiple versions of the GUI in the second treatment group and the second control group to obtain a second test data;
 determining whether a difference between the test data and the second test data is greater than a threshold;
 in response to determining that the difference is greater than the threshold, increasing the temporal granularity.

15. A non-transitory computer-readable storage medium storing instructions that, when executed by one or more processors, cause the one or more processors to perform operations comprising:
 determining a spatial granularity to divide an area into a plurality of grid cells;
 randomly splitting the plurality of grid cells into a plurality of testing groups using an application programming interface (API) library, wherein a quantity of the plurality of testing groups is determined based on a quantity of multiple versions of a Graphic User Interface (GUI) to be tested;
 determining a temporal granularity to divide a testing period into a plurality of testing intervals;
 during each of the plurality of testing intervals, respectively assigning the multiple versions of the GUI to the plurality of testing groups through an online service, wherein the assigning comprises:
  enabling, through the online service, a first version of the GUI on one or more web application or mobile application of a user device located in a first testing group to collect test data during a first testing interval, and rotating, through the online service, the assignment of the multiple versions of the GUI for a next testing interval, wherein the rotating comprises (1) disabling the first version of the GUI on one or more web application or mobile application of the user device located in the first testing group and (2) enabling the first version of the GUI on one or more web application or mobile application of a user device located in a second testing group during the next testing interval;

obtaining the test data for each of the multiple versions of the GUI; and determining an optimal version of the GUI based on the test data.

16. The storage medium of claim 15, wherein the multiple versions of the GUI comprise a default version of the GUI, and at least one new version of the GUI.

17. The storage medium of claim 15, wherein the determining a spatial granularity to divide an area comprises:

initializing the spatial granularity;

dividing the area into a plurality of spatial clusters based on the initialized spatial granularity;

randomly splitting the plurality of spatial clusters into a first mega group and a second mega group, wherein the first mega group comprises a plurality of first spatial clusters, and the second mega group comprises a plurality of second spatial clusters;

randomly dividing a plurality of individual devices located in the plurality of first spatial clusters into a first treatment group and a first control group;

randomly dividing the plurality of second spatial clusters into a second treatment group and a second control group;

testing the multiple versions of the GUI at an individual-device level in the first treatment group and the first control group to obtain a first test data;

testing the multiple versions of the GUI at a spatial-cluster level in the second treatment group and the second control group to obtain a second test data;

determining whether a difference between the first test data and the second test data is greater than a threshold;

in response to determining that the difference is greater than the threshold, increasing the spatial granularity.

18. The storage medium of claim 17, wherein the testing the multiple versions of the GUI at an individual-device level in the first treatment group and the first control group to obtain a first test data comprises:

enabling a default version of the GUI on the individual devices in the control group for a period of time to obtain a first reward;

enabling a new version of the GUI on the individual devices in the treatment group for the period of time to obtain a second reward; and determining a difference between the first reward and the second reward as the first test data.

19. The storage medium of claim 15, wherein the determining a temporal granularity to divide a testing period comprises:

initializing the temporal granularity;

dividing a period of time into a plurality of intervals, and segmenting the plurality of intervals into a first mega group and a second mega group based on the temporal granularity;

for each interval in the first mega group, randomly dividing a plurality of individual devices into a first treatment group and a first control group, and testing the multiple versions of the GUI at an individual-device level in the first treatment group and the first control group to obtain a first test data;

for each interval in the second mega group, dividing the each interval into a second treatment group and a second control group, and testing the multiple versions of the GUI in the second treatment group and the second control group to obtain a second test data;

determining whether a difference between the first test data and the second test data is greater than a threshold;

in response to determining that the difference is greater than the threshold, increasing the temporal granularity.

\* \* \* \* \*